(12) United States Patent
Reiskind

(10) Patent No.: US 11,762,877 B2
(45) Date of Patent: *Sep. 19, 2023

(54) METHOD AND SYSTEM FOR MAINTAINING PRIVACY AND COMPLIANCE IN THE USE OF ACCOUNT REISSUANCE DATA

(71) Applicant: MASTERCARD INTERNATIONAL INCORPORATED, Purchase, NY (US)

(72) Inventor: Andrew S. Reiskind, Armonk, NY (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 356 days.

This patent is subject to a terminal disclaimer.

(21) Appl. No.: 16/504,765

(22) Filed: Jul. 8, 2019

(65) Prior Publication Data
US 2019/0333046 A1 Oct. 31, 2019

Related U.S. Application Data

(63) Continuation of application No. 14/323,362, filed on Jul. 3, 2014, now Pat. No. 10,373,153.

(51) Int. Cl.
*G06F 16/27* (2019.01)
*G06Q 20/38* (2012.01)
(Continued)

(52) U.S. Cl.
CPC .......... *G06F 16/27* (2019.01); *G06Q 20/383* (2013.01); *G06Q 20/40* (2013.01); *G06Q 40/02* (2013.01);
(Continued)

(58) Field of Classification Search
CPC ......... G06Q 20/40–414; G06Q 20/383; G06Q 20/30–3567; G06F 16/20–29; G06F 16/27–289
See application file for complete search history.

(56) References Cited

U.S. PATENT DOCUMENTS 8,812,482 B1* 8/2014 Kapoor ................. G06F 16/273
707/706
9,195,848 B2* 11/2015 Davis ..................... G06Q 40/00
(Continued)

*Primary Examiner* — James D Nigh
*Assistant Examiner* — Jeffrey L Licitra
(74) *Attorney, Agent, or Firm* — PANITCH SCHWARZE BELISARIO & NADEL LLP

(57) ABSTRACT

A method for linking payment accounts includes: storing a plurality of account profiles, each profile including data related to a payment account including an account number and account data; encrypting the account number included in each account profile using a method of encryption to obtain an encrypted account number; receiving account linkage data, the data including a plurality of encrypted account identifiers, each identifier being indicated as being linked to another identifier, and each identifier being encrypted using the method of encryption; matching each of the encrypted account identifiers to an encrypted account number; and updating one or more account profiles to indicate a link to another account profile where the encrypted account number included in the profile being updated matches an encrypted account identifier that is indicated as being linked to an encrypted account identifier that matches the encrypted account number included in the other profile.

10 Claims, 9 Drawing Sheets

(51) Int. Cl.
  *G06Q 20/40*  (2012.01)
  *G06Q 40/02*  (2023.01)
  *G06Q 20/34*  (2012.01)

(52) U.S. Cl.
  CPC ........... *G06Q 20/34* (2013.01); *G06Q 20/354* (2013.01); *G06Q 2220/00* (2013.01)

(56) References Cited

U.S. PATENT DOCUMENTS

| | | | |
|---|---|---|---|
| 9,529,851 B1* | 12/2016 | Smith | G06F 21/6218 |
| 2003/0046534 A1* | 3/2003 | Alldredge | G06Q 20/383 |
| | | | 713/153 |
| 2006/0247991 A1* | 11/2006 | Jin | G06Q 40/00 |
| | | | 705/35 |
| 2007/0214037 A1* | 9/2007 | Shubert | G06Q 30/0203 |
| | | | 705/7.29 |
| 2008/0195551 A1* | 8/2008 | McIsaac | G06Q 20/3823 |
| | | | 705/75 |
| 2008/0205655 A1* | 8/2008 | Wilkins | G06Q 10/10 |
| | | | 707/999.005 |
| 2009/0171978 A1* | 7/2009 | Naono | G06F 21/78 |
| 2010/0088227 A1 | 4/2010 | Belamant | |
| 2010/0094902 A1* | 4/2010 | Vyvyan | G06F 16/27 |
| | | | 713/168 |
| 2011/0218903 A1 | 9/2011 | Demirjian | |
| 2011/0225090 A1 | 9/2011 | Hammad | |
| 2012/0296824 A1* | 11/2012 | Rosano | G06Q 20/102 |
| | | | 705/44 |
| 2015/0312038 A1* | 10/2015 | Palanisamy | G06F 21/44 |
| | | | 713/155 |

* cited by examiner

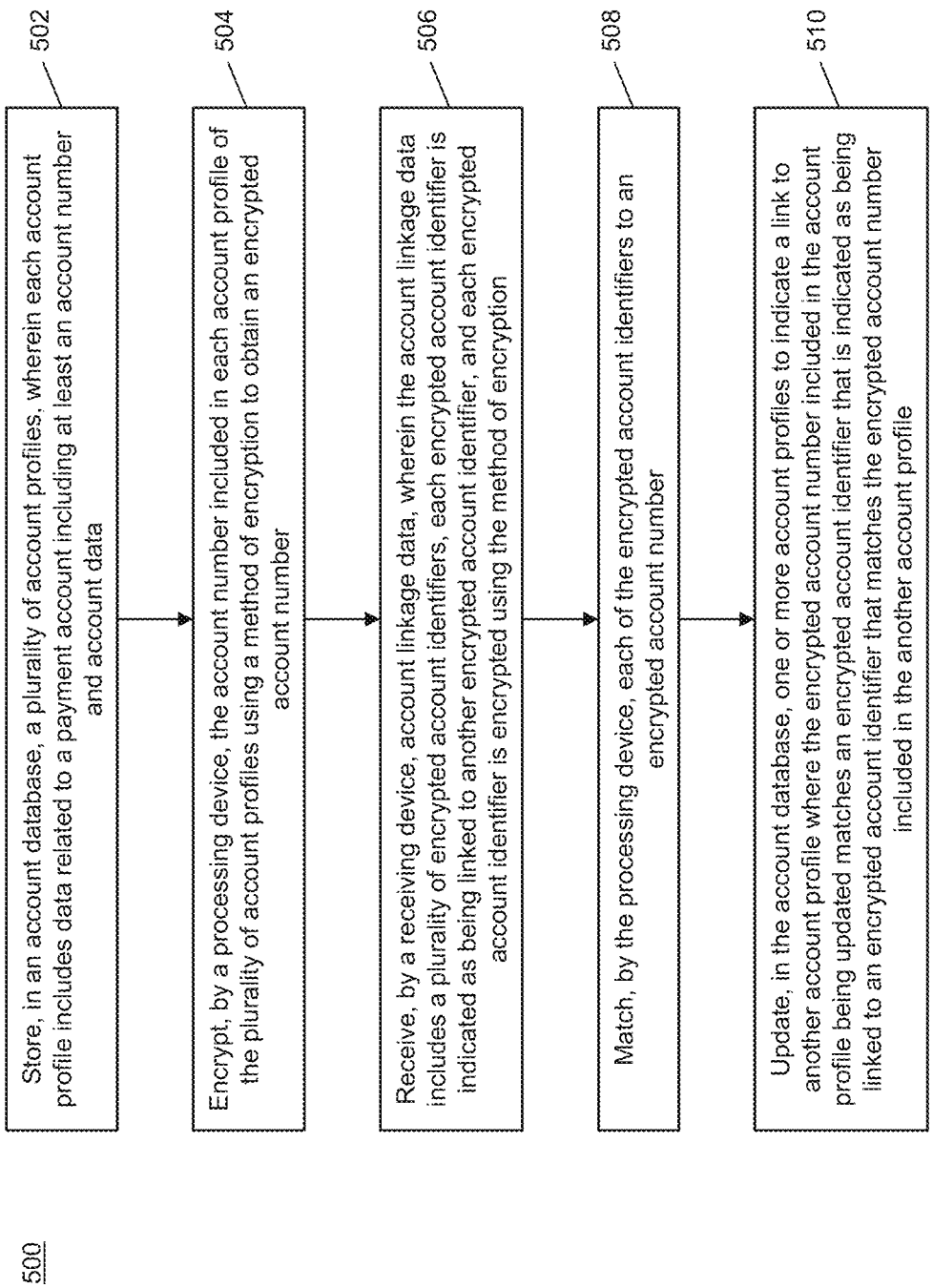

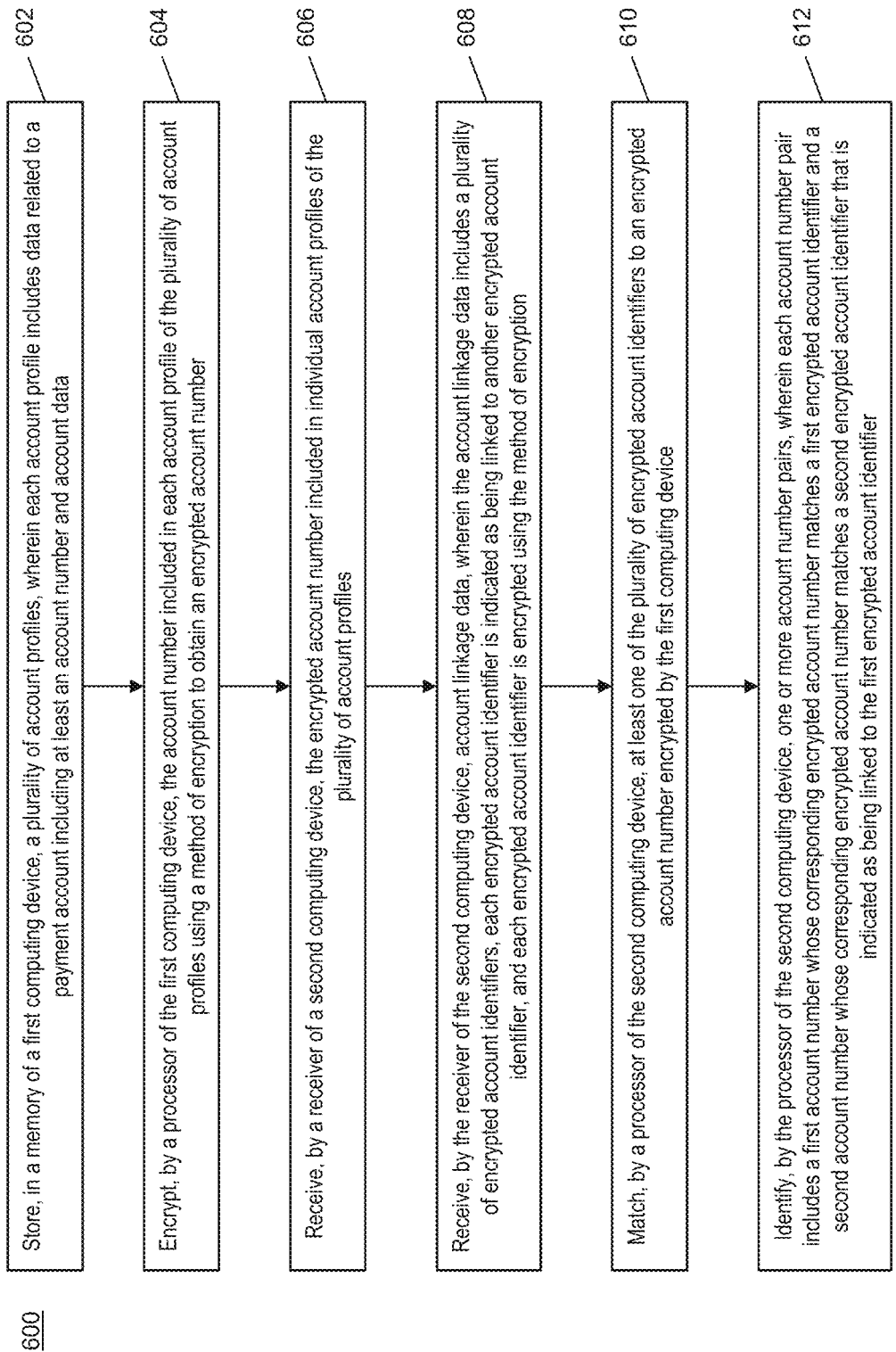

METHOD AND SYSTEM FOR MAINTAINING PRIVACY AND COMPLIANCE IN THE USE OF ACCOUNT REISSUANCE DATA

FIELD

The present disclosure relates to the linking of transaction accounts, specifically the linking of two transaction accounts, such as payment accounts representing an original and reissued payment card, while maintaining consumer privacy and compliance with privacy regulations.

BACKGROUND

The aggregation of transaction data for transaction accounts can be a valuable metric for a variety of industries. Content providers, advertisers, merchants, manufacturers, urban planners, and more all may benefit from detailed information regarding consumer spending. Consumers themselves may also benefit from such information, as they may start to receive more personalized content, offers, discounts, and more, and may receive better service from merchants and other entities as a result.

However, many entities that aggregate transaction data, such as payment networks, do so while maintaining anonymity of the transaction accounts, in order to ensure a high level of consumer privacy. In one example, transaction data may be stored for an account that is associated with a generic consumer having specific demographics that may correspond to a plurality of actual people, and thus may be associated with any number of people and not tied to any particular consumer, and thus not personally identifiable of any consumer. While such information may still be valuable to merchants, advertisers, and other third parties, the transaction data is often captured for every account without regard to accounts that may be linked.

For example, when a consumer uses a payment card, the transaction data associated with the account number of that payment card may be aggregated and stored (e.g., to an anonymized number or otherwise stored without information personally identifiable to the consumer). However, if the consumer is issued a new payment card on the same account, such as if an issuer issues a new card on the account with a new number in order to prevent fraud, the transaction data may be stored with respect to the new number. As such, the entity may unknowingly aggregate transactions for a single person under two different accounts. This may result in aggregated transaction data that is inaccurate and may therefore be less effective to advertisers and other third parties.

Thus, there is a need for a technical solution to link account profiles for a reissued transaction account while maintaining a high level of consumer privacy.

SUMMARY

The present disclosure provides a description of systems and methods for linking accounts.

A method for linking accounts includes: storing, in an account database, a plurality of account profiles, wherein each account profile includes data related to a transaction account including at least an account number and account data; encrypting, by a processing device, the account number included in each account profile of the plurality of account profiles using a method of encryption to obtain an encrypted account number; receiving, by a receiving device, account linkage data, wherein the account linkage data includes a plurality of encrypted account identifiers, each encrypted account identifier is indicated as being linked to another encrypted account identifier, and each encrypted account identifier is encrypted using the method of encryption; matching, by the processing device, each of the encrypted account identifiers to an encrypted account number; and updating, in the account database, one or more account profiles to indicate a link to another account profile where the encrypted account number included in the account profile being updated matches an encrypted account identifier that is indicated as being linked to an encrypted account identifier that matches the encrypted account number included in the another account profile.

Another method for linking accounts includes: storing, in a memory of a first computing device, a plurality of account profiles, wherein each account profile includes data related to a transaction account including at least an account number and account data; encrypting, by a processor of the first computing device, the account number included in each account profile of the plurality of account profiles using a method of encryption to obtain an encrypted account number; receiving, by a receiver of a second computing device, the encrypted account number included in individual account profiles of the plurality of account profiles; receiving, by the receiver of the second computing device, account linkage data, wherein the account linkage data includes a plurality of encrypted account identifiers, each encrypted account identifier is indicated as being linked to another encrypted account identifier, and each encrypted account identifier is encrypted using the method of encryption; matching, by a processor of the second computing device, at least one of the plurality of encrypted account identifiers to an encrypted account number encrypted by the first computing device; and identifying, by the processor of the second computing device, one or more account number pairs, wherein each account number pair includes a first account number whose corresponding encrypted account number matches a first encrypted account identifier and a second account number whose corresponding encrypted account number matches a second encrypted account identifier that is indicated as being linked to the first encrypted account identifier.

A system for linking accounts includes an account database, a processing device, and a receiving device. The account database is configured to store a plurality of account profiles, wherein each account profile includes data related to a transaction account including at least an account number and account data. The processing device is configured to encrypt the account number included in each account profile of the plurality of account profiles using a method of encryption to obtain an encrypted account number. The receiving device is configured to receive account linkage data, wherein the account linkage data includes a plurality of encrypted account identifiers, each encrypted account identifier is indicated as being linked to another encrypted account identifier, and each encrypted account identifier is encrypted using the method of encryption. The processing device is further configured to: match each of the encrypted account identifiers to an encrypted account number; and update, in the account database, one or more account profiles to indicate a link to another account profile where the encrypted account number included in the account profile being updated matches an encrypted account identifier that is indicated as being linked to an encrypted account identifier that matches the encrypted account number included in the another account profile.

Another system for linking accounts includes a first computing device and a second computing device. The first computing device includes: a memory configured to store a plurality of account profiles, wherein each account profile includes data related to a transaction account including at least an account number and account data; and a processing device configured to encrypt the account number included in each account profile of the plurality of account profiles using a method of encryption to obtain an encrypted account number. The second computing device includes a receiver and a processor. The receiver is configured to receive: the encrypted account number included in individual account profiles of the plurality of account profiles; and account linkage data, wherein the account linkage data includes a plurality of encrypted account identifiers, each encrypted account identifier is indicated as being linked to another encrypted account identifier, and each encrypted account identifier is encrypted using the method of encryption. The processor is configured to: match at least one of the plurality of encrypted account identifiers to an encrypted account number encrypted by the first computing device; and identify one or more account number pairs, wherein each account number pair includes a first account number whose corresponding encrypted account number matches a first encrypted account identifier and a second account number whose corresponding encrypted account number matches a second encrypted account identifier that is indicated as being linked to the first encrypted account identifier.

BRIEF DESCRIPTION OF THE DRAWING FIGURES

The scope of the present disclosure is best understood from the following detailed description of exemplary embodiments when read in conjunction with the accompanying drawings. Included in the drawings are the following figures:

FIGS. 5 and 6 are flow charts illustrating exemplary methods for linking accounts in accordance with exemplary embodiments.

Figure 1:
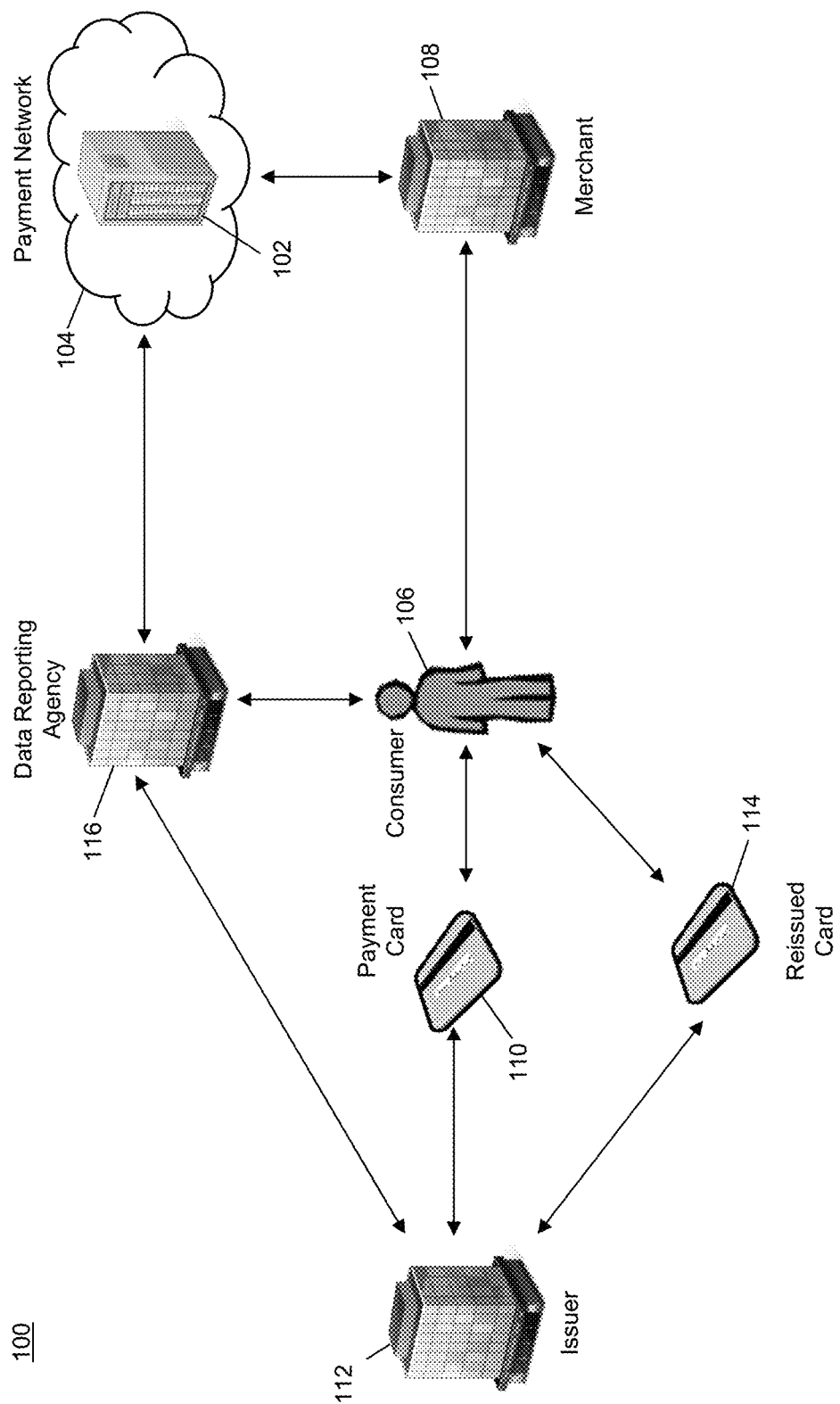
FIG. 1 is a high level architecture illustrating a system for the linking transaction accounts in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by MasterCard®, VISA®, Discover®, American Express®, etc.

Transaction account—A financial account that may be used to fund a transaction, such as a checking account, savings account, credit account, virtual payment account, etc. A transaction account may be associated with an entity, which may include a person, family, company, corporation, governmental entity, etc. In some instances, a payment account may be virtual, such as those accounts operated by PayPal®, etc.

Payment Card—A card or data associated with a transaction account that may be provided to a merchant in order to fund a financial transaction via the associated transaction account. Payment cards may include credit cards, debit cards, charge cards, stored-value cards, prepaid cards, fleet cards, virtual payment numbers, virtual card numbers, controlled payment numbers, etc. A payment card may be a physical card that may be provided to a merchant, or may be data representing the associated payment account (e.g., as stored in a communication device, such as a smart phone or computer). For example, in some instances, data including a payment account number may be considered a payment card for the processing of a transaction funded by the associated transaction account. In some instances, a check may be considered a payment card where applicable.

Personally identifiable information (PII)—PII may include information that may be used, alone or in conjunction with other sources, to uniquely identify a single individual. Information that may be considered personally identifiable may be defined by a third party, such as a governmental agency (e.g., the U.S. Federal Trade Commission, the European Commission, etc.), a non-governmental organization (e.g., the Electronic Frontier Foundation), industry custom, consumers (e.g., through consumer surveys, contracts, etc.), codified laws, regulations, or statutes, etc. The present disclosure provides for methods and systems where the processing server 102 does not possess any personally identifiable information. Systems and methods apparent to persons having skill in the art for rendering potentially personally identifiable information anonymous may be used, such as bucketing. Bucketing may include aggregating information that may otherwise be personally identifiable (e.g., age, income, etc.) into a bucket (e.g., grouping) in order to render the information not personally identifiable. For example, a consumer of age 26 with an income of $65,000, which may otherwise be unique in a particular circumstance to that consumer, may be represented by an age bucket for ages 21-30 and an income bucket for incomes $50,000 to $74,999, which may represent a large portion of additional consumers and thus no longer be personally identifiable to that consumer. In other embodiments, encryption may be used. For example, personally identifiable information (e.g., an account number) may be encrypted (e.g., using a one-way encryption) such that the processing server 102 may not possess the PII or be able to decrypt the encrypted PII.

System for Linking Transaction Accounts

FIG. 1 illustrates a system 100 for linking accounts corresponding to reissued or otherwise associated transaction accounts while maintaining consumer privacy and compliance with privacy regulations.

The system 100 may include a processing server 102. The processing server 102, discussed in more detail below, may be configured to link payment accounts, such as two different account profiles that correspond to a single consumer, using the methods and systems discussed herein. In some embodiments, the processing server 102 may be a part of a payment network 104. The payment network 104 may be configured to process payment transactions for a plurality of payment accounts using methods and systems that will be apparent to persons having skill in the relevant art, and may forward transaction data to the processing server 102 for aggregation and storage therein. In some instances, the processing server 102 may process payment transactions as part of the payment network 104.

The system 100 may further include a consumer 106. The consumer 106 may conduct payment transactions at one or more merchants 108. It should be apparent to persons having skill in the relevant art that the methods and systems discussed herein may be suitable for linking accounts associated with any suitable entity and consumers 106 include individuals, as businesses, corporations, families, and virtually any other legal entity capable of being assigned an account that is linked directly or indirectly to transaction records. The consumer 106 may use a payment card 110 to pay for the conducted transactions. When the transaction is processed, the processing server 102 may store transaction data for the payment transaction as associated with the payment card 110, such as by being associated with the payment account number corresponding to the payment card 110. The transaction data may be stored in an account profile including the payment account number, as discussed in more detail below.

The payment card 110 may be issued to the consumer 106 by an issuer 112. The issuer 112 may be an issuing bank or other financial institution suitable for issuing payment cards to consumers as will be apparent to persons having skill in the relevant art. The issuer 112 may eventually issue a reissued card 114 to the consumer 106 on the same payment account. For example, in one instance the issuer 112 may issue a reissued card 114 if the consumer 106 reports the payment card 110 as lost or stolen. In another instance, the issuer 112 may issue a reissued card 114 if the consumer 106 transacts with a merchant 108 whose security has been compromised, placing the payment card 110 at risk.

The consumer 106 may then use the reissued card 114 at one or more merchants 108 to conduct payment transactions. The payment network 104 may process the transactions, and may forward transaction data for the transactions to the processing server 102. The processing server 102 may create a new account profile corresponding to the reissued card 114 and may store the transaction data in the new account profile.

The system 100 may also include a data reporting agency 116. The data reporting agency 116 may be configured to collect data regarding the consumer 106 and associated payment accounts. For example, the data reporting agency 116 may be a credit bureau, configured to collect demographic data associated with the consumer 106 and account data associated with payment accounts corresponding to the consumer 106. The data reporting agency 116 may collect the consumer data from the consumer 106 and the issuer 112 and may store the data in a consumer profile.

When the issuer 112 issues a payment card 110 to the consumer 106, data regarding the issuance may be provided to (e.g., or sent in response to a request by) the data reporting agency 116 and stored in a corresponding profile. Once the issuer 112 issues the reissued card 114 to the consumer 106, the data reporting agency 116 may update the consumer profile accordingly, such as to reflect the linkage between the payment card 110 and the reissued card 114.

The processing server 102 may request account linkage data from the data reporting agency 116. The data reporting agency 116 may then provide account linkage data to the processing server 102, which may include a plurality of account numbers and indications of linkages between account numbers, such as for the payment card 110 and the reissued card 114. In an exemplary embodiment, the data reporting agency 114 may first encrypt each of the account numbers prior to transmitting to the processing server 102, such that the processing server 102 can maintain a high level of consumer privacy. The account numbers may be encrypted with any form of encryption suitable for performing the functions disclosed herein. For example, the encryption may include the use of a hashing algorithm, such as a SHA-2 cryptographic hash function. In some instances, a salt may also be used as part of the encryption of account numbers, such as in conjunction with a cryptographic hash function.

The processing server 102 may be configured to encrypt the account numbers stored in the account profiles prior to receipt of the account linkage data from the data reporting agency 116. In some instances, the account numbers may be encrypted such that the unencrypted account numbers are no longer kept and/or are otherwise unavailable. For instance, in one example, the account numbers may be encrypted with a one-way encryption. The encryption used by the processing server 102 may be the same encryption used by the data reporting agency 116 such that there may be correspondence between account numbers encrypted by the processing server 102 and account numbers encrypted by the data reporting agency 116.

The processing server 102 may receive the account linkage data from the data reporting agency 116 including the encrypted account numbers and indication of links thereof. The processing server 102 may then match received encrypted account numbers with the locally stored encrypted account numbers. The processing server 102 can then link account profiles based on the links indicated in the account linkage data, and therefore possess linked payment accounts including transaction data. The use of encrypted account identifiers may thereby enable the processing server 102 to have the linked account and transaction data, without the data being personally identifiable to the consumer 106, payment card 110, or reissued card 114.

In some embodiments, the processing server 102 may include multiple computing devices. As discussed in more detail below, the multiple computing devices may be used such that a computing device that receives the account linkage data may not be in possession of any unencrypted account numbers or otherwise potentially identifying information. In embodiments where the processing server 102 is a single computing device, the processing server 102 may be configured to not possess any unencrypted account numbers or potentially identifying information when account linkage data is received. In one instance, account numbers may be encrypted and unencrypted account numbers removed prior to receipt of account linkage data. In another instance, the processing server 102 may receive and store only encrypted account numbers, the payment network 104 may transmit transaction data associated with encrypted account numbers for storage thereof. Additional methods for avoiding the use of personally identifiable information will be apparent to persons having skill in the relevant art.

In some embodiments, the processing server 102 may be configured to de-identify account linkage data and/or account data, such as to maintain compliance with one or more security and/or privacy regulations. Suitable methods for de-identifying data may include bucketing, disguising variables, and/or other form of anonymization. Additional information regarding the anonymization of data may be found in the Anonymisation Code of Practice published by the Information Commissioner's Office.

By linking account profiles and transaction data included therein using encrypted account numbers and based on account linkage data obtained from a compliant data reporting agency 116, the processing server 102 may be able to properly link transaction data for linked payment account without compromising consumer security. The use of encrypted data may safeguard any personally identifiable information of consumers, while still yielding aggregated transaction data that is useful for merchants, advertisers, and more. Furthermore, the use of the methods and systems discussed herein may enable the processing server 102 to ensure compliance with any regulations regarding consumer privacy, which may also provide valuable peace of mind to consumers.

It will be apparent to persons having skill in the relevant art that, although illustrative examples provided herein may include accounts being linked being payment accounts, any suitable type of transaction account may be linked using the methods and systems discussed herein. For instance, in one example, transaction accounts where the included account numbers are, or where the accounts or otherwise associated with, telephone numbers may be linked together using the methods and systems discussed herein. Additional suitable types of transaction accounts will be apparent to persons having skill in the relevant art.

Processing Server

Figure 2:
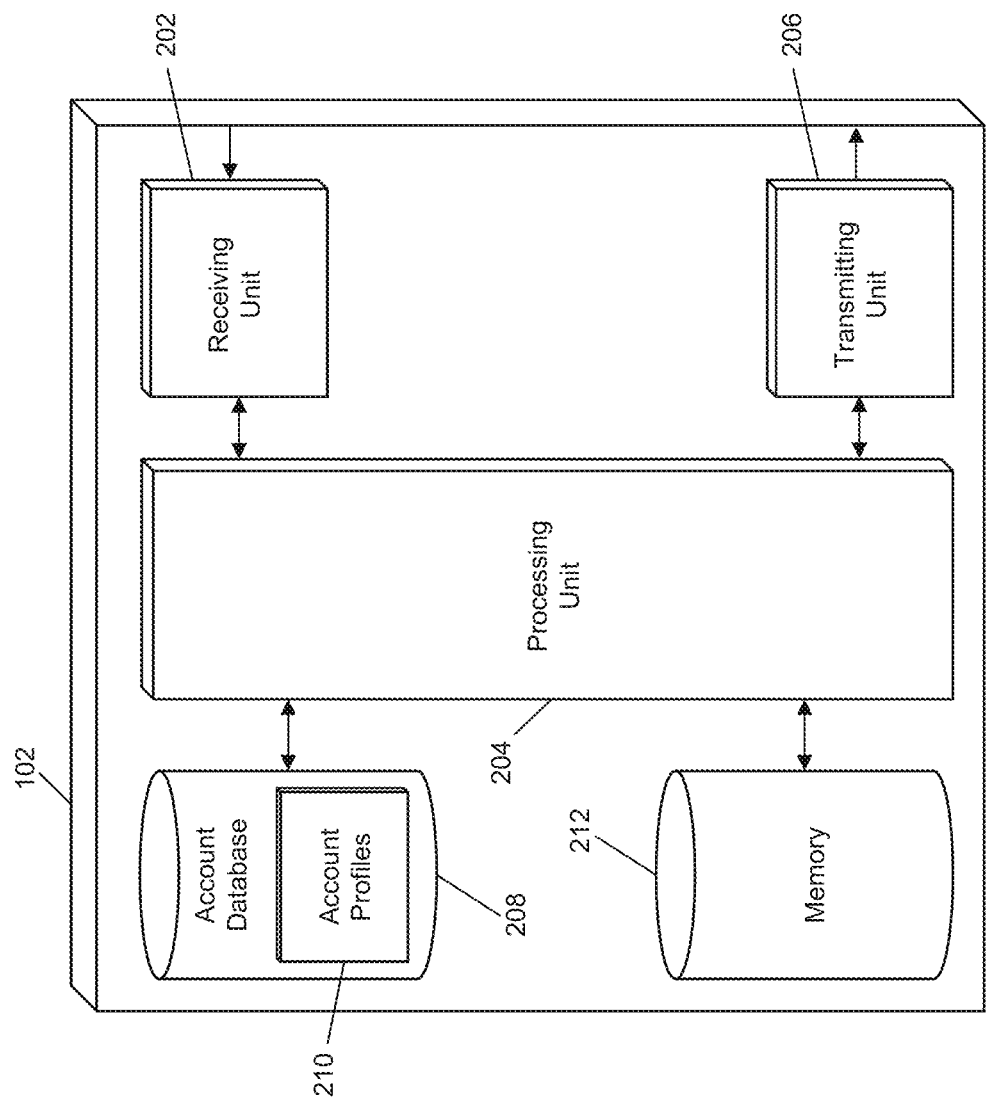
FIG. 2 is a block diagram illustrating the processing server of FIG. 1 for the linking of transaction accounts in accordance with exemplary embodiments.

FIG. 2 illustrates an embodiment of the processing server 102 of the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 700 illustrated in FIG. 7 and discussed in more detail below may be a suitable configuration of the processing server 102.

The processing server 102 may include a receiving unit 202. The receiving unit 202 may be configured to receive data over one or more networks via one or more network protocols. The receiving unit 202 may account data for one or more payment accounts from the payment network 104 as part of the processing of payment transactions. The account data may be stored in an account database 208 in a plurality of account profiles 210.

Each account profile 210 may include data related to a payment account and may include at least an account number and account data. In some instances, the account data may include transaction data for a plurality of payment transactions funded by the related payment account. The transaction data may be received by the receiving unit 202 and stored in the account profile 210 that includes an account number included in the received transaction data.

The processing server 102 may further include a processing unit 204. The processing unit 204 may be configured to perform the functions disclosed herein. In some instances, the processing unit 204 may also be configured to process payment transactions as part of the payment network 104, such as using methods and systems as will be apparent to persons having skill in the relevant art. In such an embodiment, the processing server 102 may generate account profiles 210 and store account data therein as part of the processing of the payment transactions.

The processing unit 204 may be further configured to encrypt account numbers. The account numbers may be encrypted in the stored account profiles 210 using any suitable method of encryption as will be apparent to persons having skill in the relevant art. In some embodiments, the processing unit 204 may encrypt the account numbers when received from the by the receiving unit 202, such that the account data stored in the account profiles 210 and possessed by the processing server 102 may never be associated with personally identifiable information.

The receiving unit 202 may be further configured to receive account linkage data from the data reporting agency 116. The account linkage data may include a plurality of encrypted account identifiers, with each encrypted account identifier being indicated as being linked to another encrypted account identifier. The account identifiers may be encrypted using the same method of encryption used by the processing unit 204 to encrypt the account numbers stored in the account profiles 210. In some embodiments, the processing unit 204 may de-identify the received account linkage data upon receipt, such as to remove any potentially identifiable information.

The processing unit 204 may be further configured to match the received encrypted account identifiers in the account linkage data to the encrypted account numbers included in the account profiles 210. Once the numbers have been matched, the processing unit 204 may link the account profiles 210 that include encrypted account numbers whose corresponding encrypted account identifiers are indicated in the account linkage data as being linked.

The processing server 102 may further include a memory 212. The memory 212 may be configured to store data suitable for performing the functions disclosed herein. For example, the memory 212 may store one or more encryption algorithms and/or code for execution of corresponding encryption methods suitable for use by the processing unit 204 to encrypt account numbers. Additional data that may be included in the memory 212 will be apparent to persons having skill in the relevant art.

Process for Linking Payment Accounts in a Single Computing Device

Figure 3A:
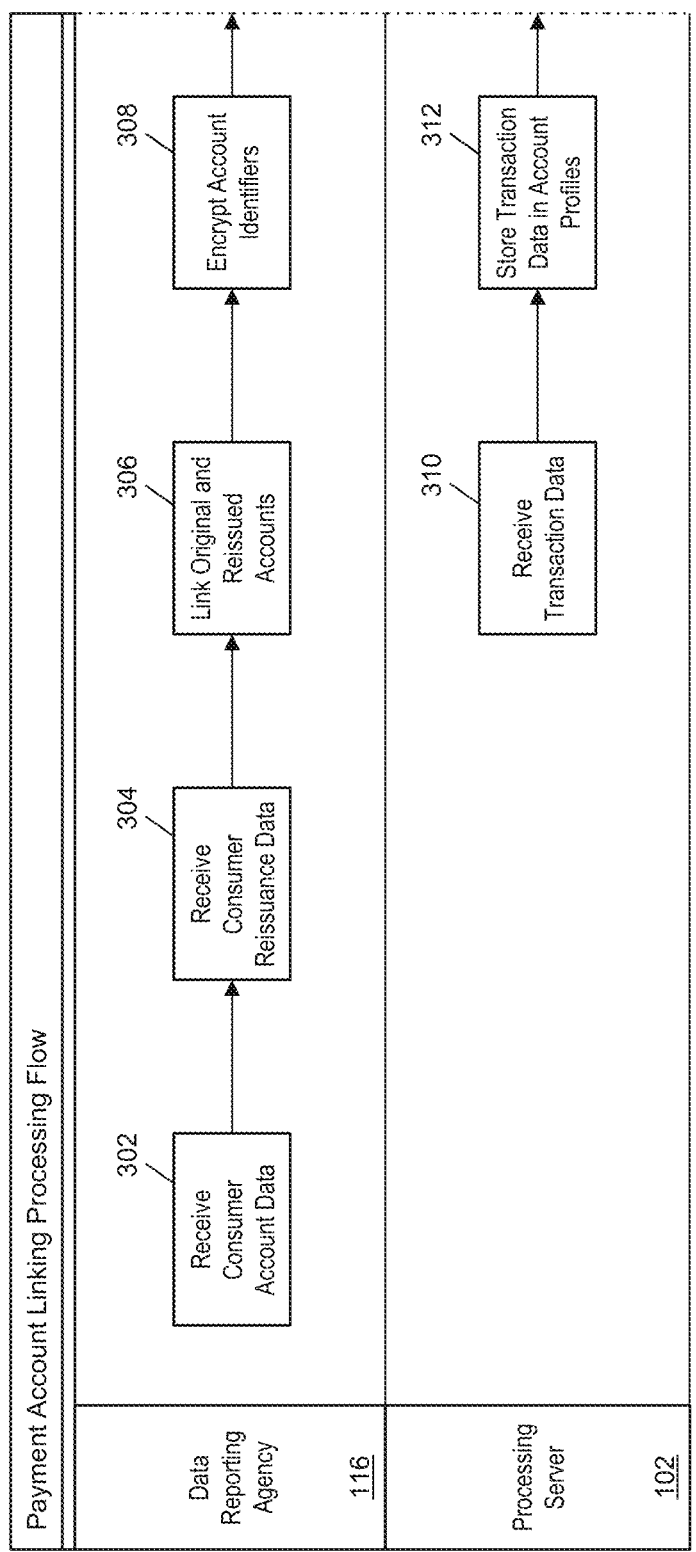
FIGS. 3A and 3B are a processing flow illustrating a process for maintaining consumer privacy in linking accounts using a single computing device in accordance with exemplary embodiments.
Figure 3B:
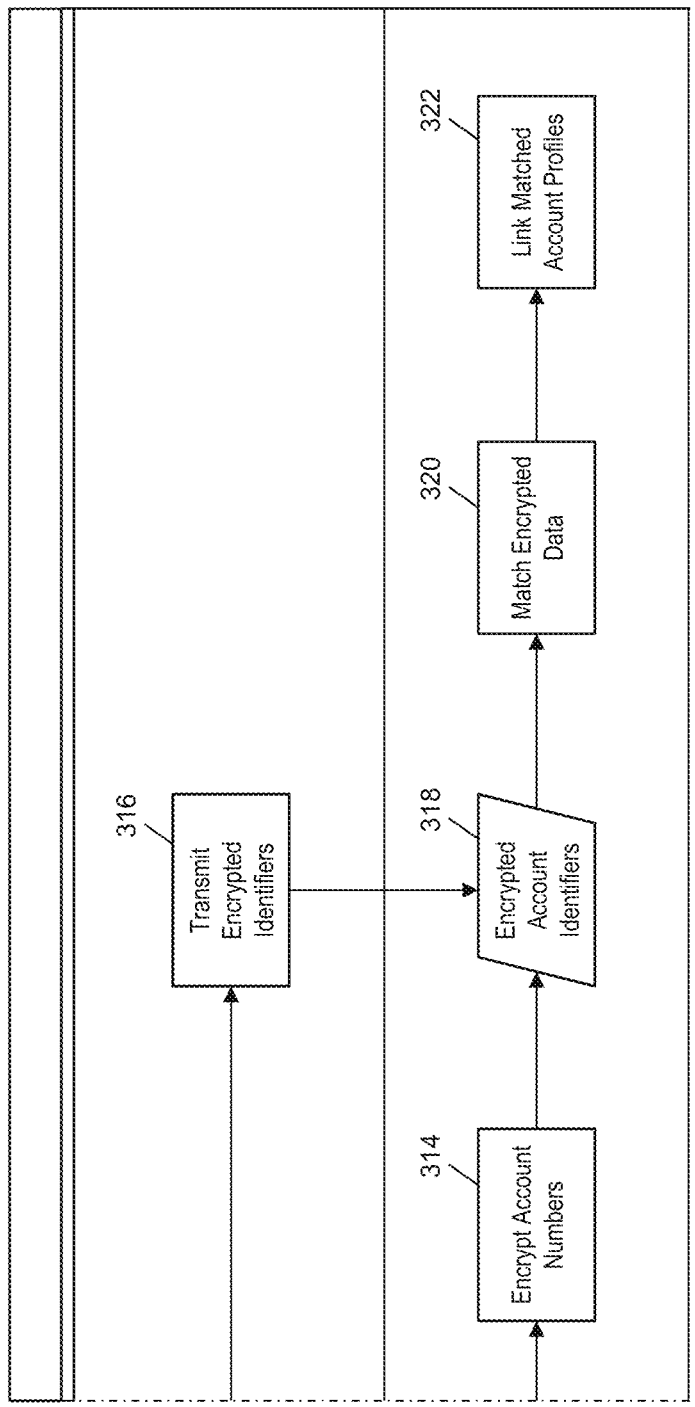

FIGS. 3A and 3B illustrate a processing flow for a process for linking payment accounts using the processing server 102 as a single computing device.

In step 302, the data reporting agency 116 may receive consumer data associated with a payment card 110 corresponding to a payment account, such as from the consumer 106 and/or the issuer 112. In step 304, the data reporting agency 116 may receive consumer data associated with a reissued payment card 114 corresponding to the same payment account or otherwise linked with the payment account, such as from the consumer 106 and/or the issuer 112. In step 306, the data reporting agency 116 may link an account associated with the payment card 110 and an account associated with the reissued card 114.

In step 308, the data reporting agency 116 may encrypt account identifiers for the linked accounts using a method of encryption. In step 310, the receiving unit 202 of the processing server 102 may receive transaction data for a plurality of payment transactions from the payment network 104. The transaction data may include an account number used for funding each corresponding payment transaction. In step 312, the processing unit 204 may generate a plurality of account profiles 210 and store them therein in the account database 208. Each account profile 210 may include an account number and transaction data for the payment transactions that include the respective account number.

In step 314, the processing unit 204 may encrypt the account numbers included in each account profile 210 in the account database 208. The account numbers may be encrypted using the same method of encryption used by the data reporting agency 116 to encrypt the account identifiers. In an exemplary embodiment, the processing server 102 may not possess any information regarding the unencrypted account numbers once the account numbers have been encrypted, such that the processing server 102 may possess no personally identifiable information. In step 316, the data reporting agency 116 may transmit account linkage data that includes the encrypted account identifiers and indications of links thereof to the processing server 102. In step 318, the receiving unit 202 may receive the account linkage data.

In step 320, the processing unit 204 may match the encrypted account identifiers to the encrypted account numbers. In step 322, the processing unit 204 may update the account profiles 210 to indicate links where the included encrypted account number is matched with an encrypted account identifier that is linked to another encrypted account identifier, such that linked account profiles 210 include encrypted account numbers that are matched to linked encrypted account identifiers.

Process for Linking Payment Accounts Using Multiple Computing Devices

Figure 4A:
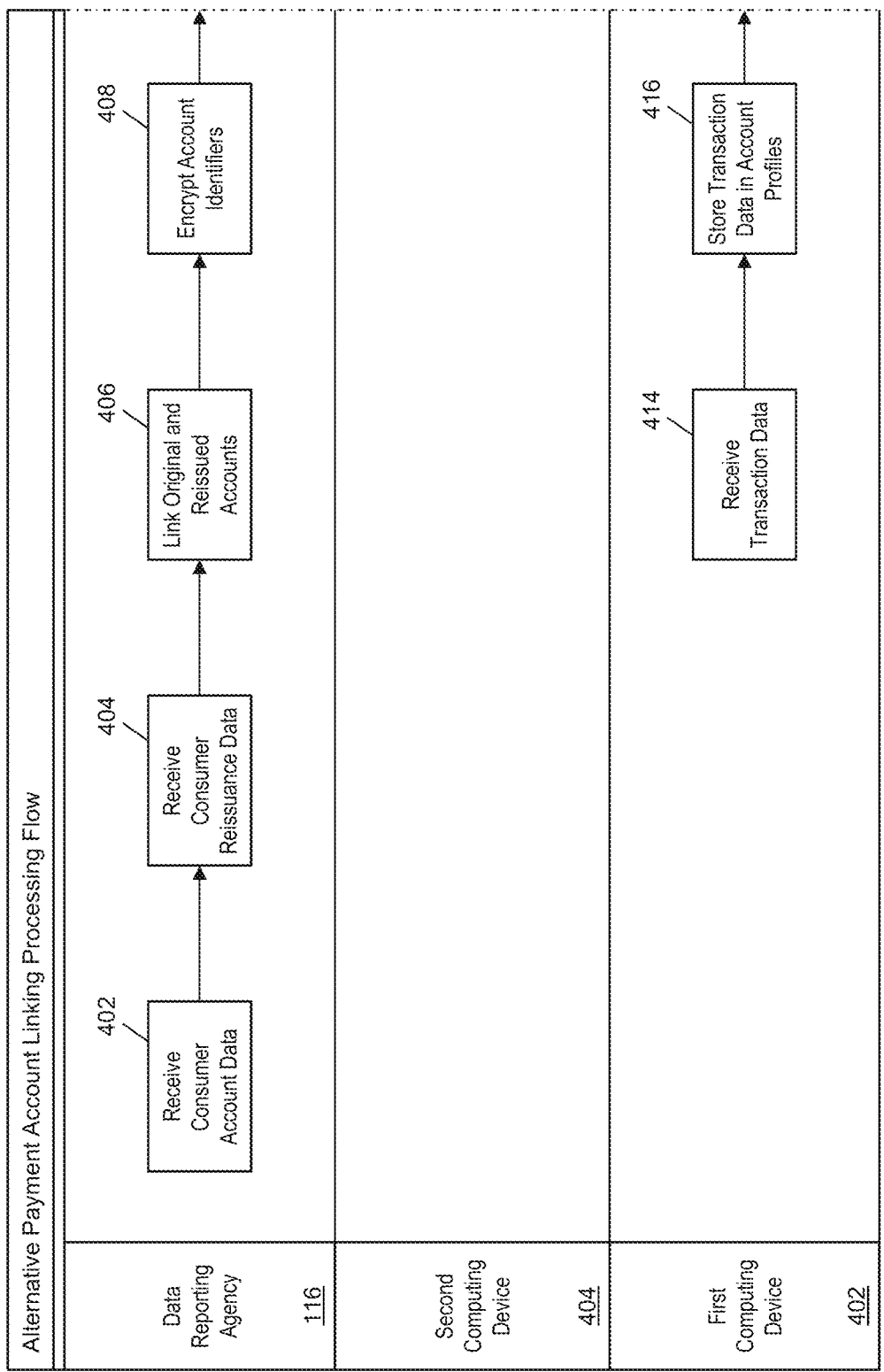
FIGS. 4A and 4B are a processing flow illustrating a process for maintaining consumer privacy in linking accounts using multiple computing devices in accordance with exemplary embodiments.
Figure 4B:
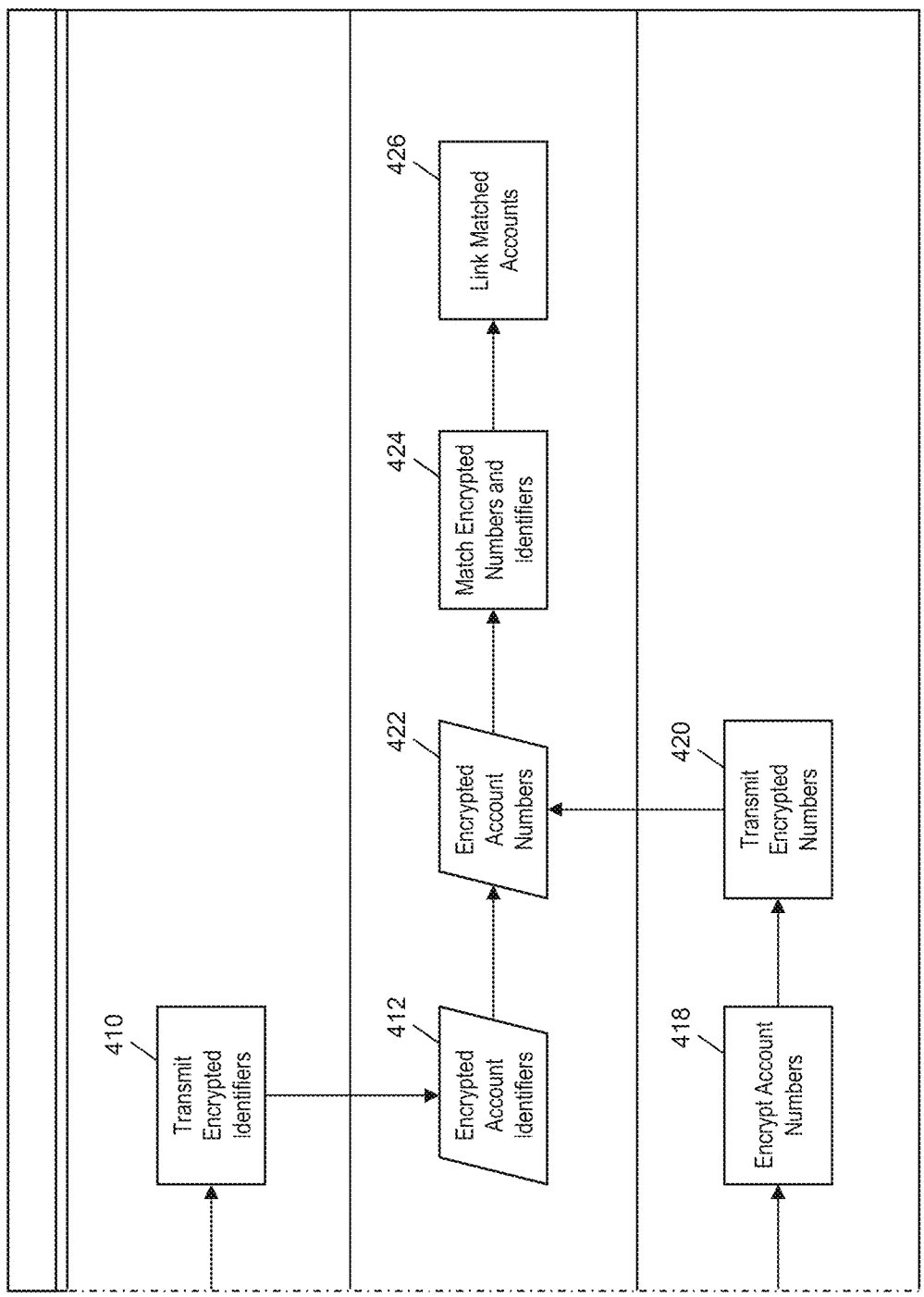

FIGS. 4A and 4B illustrate a processing flow for the linking of payment accounts using a first computing device 402 and a second computing device 404. The first computing device 402 and second computing device 404 may include the same components as the processing server 102 and may be configured to perform the same or similar functions as the processing server 102 as discussed herein. As discussed below, the first computing device 402 and second computing device 404 may be used such that the first computing device 402 may store transaction data with unencrypted account numbers, while the second computing device 404 may be used to identify linked payment accounts, ensuring that the first computing device 402 does not possess account linkage data that may be potentially personally identifiable.

In step 402, the data reporting agency 116 may receive consumer data associated with a payment card 110 corresponding to a payment account, such as from the consumer 106 and/or the issuer 112. In step 404, the data reporting agency 116 may receive consumer data associated with a reissued payment card 114 corresponding to the same payment account or otherwise linked with the payment account, such as from the consumer 106 and/or the issuer 112. In step 406, the data reporting agency 116 may link an account associated with the payment card 110 and an account associated with the reissued card 114.

In step 408, the data reporting agency 116 may encrypt account identifiers for the linked accounts using a method of encryption. In step 410, the data reporting agency 116 may transmit the encrypted account identifiers and indications of links thereof to the second computing device 404. In step 412, the receiving unit 202 of the second computing device 404 may receive the encrypted account identifiers and indicated links between encrypted account identifiers.

In step 414, the receiving unit 202 of the first computing device 402 may receive transaction data for a plurality of payment transactions from the payment network 104. The transaction data may include an account number used for funding each corresponding payment transaction. In step 416, the processing unit 204 of the first computing device 402 may generate a plurality of account profiles 210 and store them therein in the account database 208. Each account profile 210 may include an account number and transaction data for the payment transactions that include the respective account number.

In step 418, the processing unit 204 of the first computing device 402 may encrypt the account numbers stored in the account profiles 210. The encryption may be performed using the same method of encryption as used by the data reporting agency 116. In step 420, the transmitting unit 206 of the first computing device 402 may transmit the encrypted account numbers to the second computing device 404. In some embodiments, the first computing device 402 may also transmit the transaction data stored in the corresponding account profiles 210, such that the second computing device 404 may receive the encrypted account numbers and corresponding transaction data without possessing or otherwise having access to unencrypted account numbers.

In step 422, the receiving unit 202 of the second computing device 404 may receive the encrypted account numbers, which may include the associated transaction data. In step 424, the processing unit 204 of the second computing device 404 may match the encrypted account numbers to encrypted account identifiers. Then, in step 426, the processing unit 204 of the second computing device 404 may match encrypted account numbers based on links indicated in their corresponding matched encrypted account identifiers.

First Exemplary Method for Linking Payment Accounts

FIG. 5 illustrates a method 500 for the linking of payment accounts based on account linkage data.

In step 502, a plurality of account profiles (e.g., account profiles 210) may be stored in an account database (e.g., the account database 208), wherein each account profile 210 includes data related to a payment account including at least an account number and account data. In one embodiment, the account data may include a plurality of transaction data entries, wherein each transaction data entry includes data related to a payment transaction involving the related payment account and including at least transaction data. In step 504, the account number included in each account profile of the plurality of account profiles may be encrypted by a processing device (e.g., the processing unit 204) using a method of encryption to obtain an encrypted account number.

In step 506, account linkage data may be received by a receiving device (e.g., the receiving unit 202), wherein the account linkage data includes a plurality of encrypted account identifiers, and wherein each encrypted account identifier is indicated as being linked to another encrypted account identifier, and where each encrypted account identifier is encrypted using the method of encryption. In some embodiments, the account linkage data may be de-identified prior to receipt by the receiving device 202. In step 508, each of the encrypted account identifiers may be matched to an encrypted account number by the processing device 204.

In step 510, one or more account profiles 210 in the account database 208 may be updated to indicate a link to another account profile 210 where the encrypted account number included in the account profile 210 being updated matches an encrypted account identifier that is indicated as being linked to an encrypted account identifier that matches the encrypted account number included in the another account profile 210. In some embodiments, each encrypted account identifier may correspond to a payment card (e.g., the payment card 110) associated with a payment account, and wherein the another encrypted account identifier indicated as being linked to the encrypted account identifier corresponds to a reissued payment card (e.g., the reissued card 114) associated with the payment account. In one embodiment, updating the one or more account profiles 210 to indicate a link to another account profile includes merging each of the one or more account profiles 210 with the linked another account profile 210.

Second Exemplary Method for Linking Payment Accounts

FIG. 6 illustrates a method 600 for the linking of payment accounts based on account linkage data using multiple computing devices.

In step 602, a plurality of account profiles (e.g., account profiles 210) may be stored in a memory (e.g., the memory 212) of a first computing device (e.g., the first computing device 402), wherein each account profile 210 includes data related to a payment account including at least an account number and account data. In step 604, the account number included in each account profile of the plurality of account profiles may be encrypted by a processor (e.g., the processing unit 204) of the first computing device 402 using a method of encryption to obtain an encrypted account number.

In step 606, a receiver (e.g., the receiving unit 202) of a second computing device (e.g., the second computing device 404) may receive the encrypted account number included in individual account profiles 210 of the plurality of account profiles 210. In step 608, the receiver 202 of the second computing device 404 may receive account linkage data, wherein the account linkage data includes a plurality of encrypted account identifiers, each encrypted account identifier being indicated as being linked to another encrypted account identifier, and where each encrypted account identifier is encrypted using the method of encryption. In some embodiments, the account linkage data may be de-identified prior to receipt by the receiver 202 of the second computing device 404.

In step 610, at least one of the plurality of encrypted account identifiers may be matched by a processor 204 of the second computing device 404 to an encrypted account number encrypted by the first computing device 402. In step 612, one of more account number pairs may be identified by the processor 204 of the second computing device 404, wherein each account number pair includes a first account number whose corresponding encrypted account number matches a first encrypted account identifier and a second account number whose corresponding encrypted account number matches a second encrypted account identifier that is indicated as being linked to the first encrypted account identifier.

In some embodiments, updating the one or more account profiles 210 to indicate a link to another account profile 210 may include merging each of the one or more account profiles 210 with the linked another account profile 210. In one embodiment, each encrypted account identifier may correspond to a payment card (e.g., the payment card 110) associated with a payment account, and the another encrypted account identifier indicated as being linked to the encrypted account identifier may correspond to a reissued payment card (e.g., reissued card 114) associated with the payment account.

In some embodiments, the method 600 may further include: storing, in a memory 212 of the second computing device 404, the plurality of account profiles 210, wherein each account profile 210 includes at least the respective encrypted account number and account data; and updating, by the processor 204 of the second computing device 404, one or more account profiles 210 stored in the memory 212 to indicate a link to another account profile 210, wherein the account number included in the account profile 210 being updates is a first account number in a specific account number pair, and the account number included in the another account profile is a second account number included in the specific account number pair.

Computer System Architecture

Figure 7:
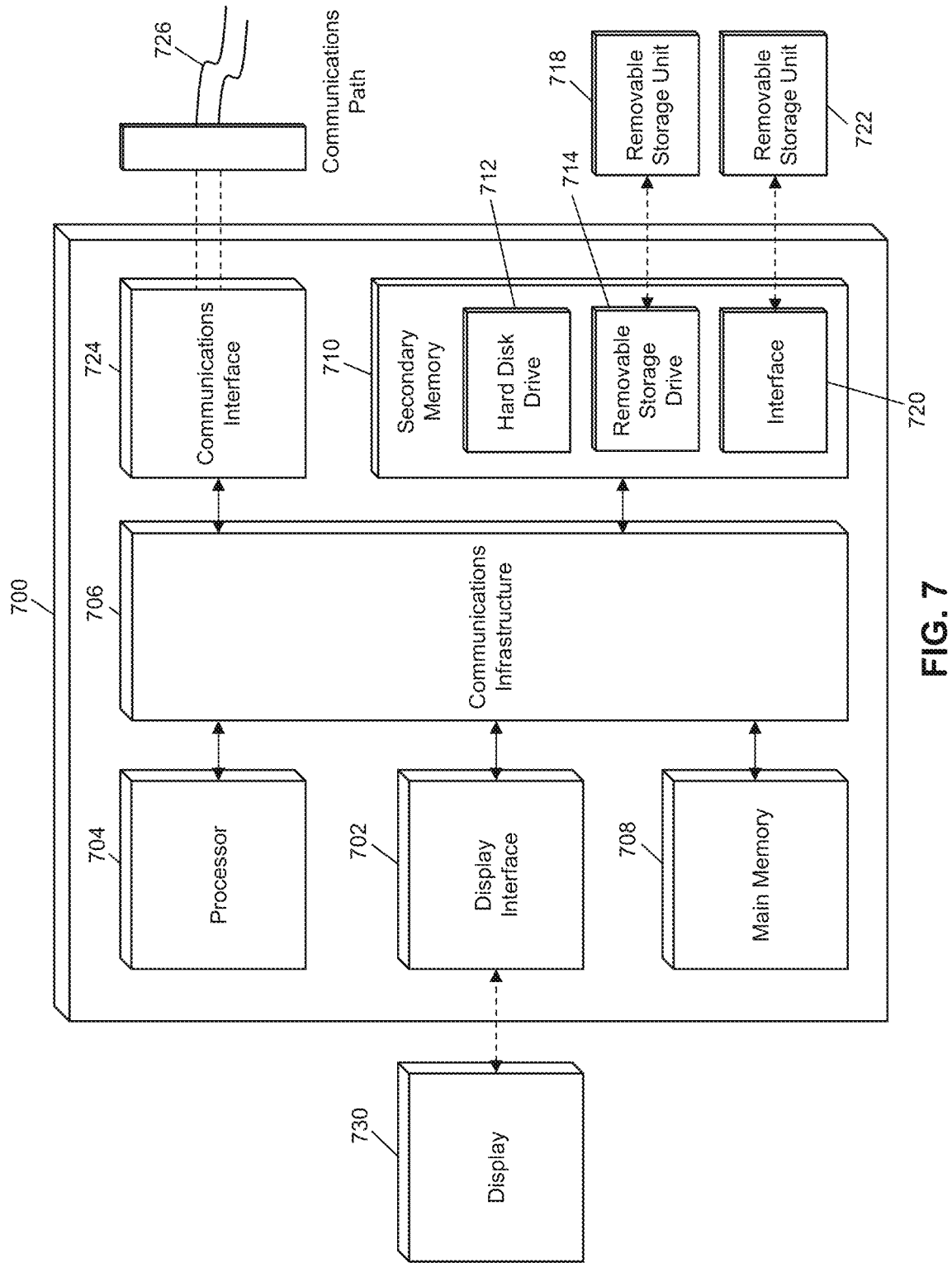
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the processing server 102 of FIG. 1 and first computing device 402 and second computing device 404 of FIGS. 4A and 4B may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A, 3B, 4A, 4B, 5, and 6.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 3A, 3B, 4A, 4B, 5, and 6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

Techniques consistent with the present disclosure provide, among other features, systems and methods for linking payment accounts. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for linking accounts, comprising:
   storing, in a memory of a first computing device, a plurality of account profiles, wherein each account profile includes at least an account number and account data;
   encrypting, by a processor of the first computing device, via a one-way encryption, the account number included in each account profile to obtain an encrypted account number;
   transmitting, by a transmitter of the first computing device, to a second computing device, the encrypted account number encrypted by the processor of the first computing device, wherein said second computing device does not receive any unencrypted account numbers from the first computing device;
   subsequent to encrypting the account number included in each account profile, receiving, by a receiver of the second computing device, account linkage data from an external computing system separate and distinct from the first computing device and the second computing device, said account linkage data including (i) a plurality of encrypted account identifiers encrypted by said external computing system and (ii) indications of linkages between encrypted account identifiers of the plurality of encrypted account identifiers included in the account linkage data,
   wherein the second computing device does not receive any unencrypted account numbers from the external computing system, wherein the one-way encryption used by the processor of the first computing device to encrypt the account number included in each account profile is the same as an encryption used to encrypt the encrypted account identifiers included in the account linkage data received by the receiving device of the payment processing server, and wherein the first computing device does not possess the account linkage data received by the second computing device from the external computing system;

matching, by a processor of the second computing device, at least one encrypted account identifier of the plurality of encrypted account identifiers included in the received account linkage data to an encrypted account number encrypted by the first computing device; and identifying, by the processor of the second computing device, one or more account number pairs, wherein each account number pair includes a first account number whose corresponding encrypted account number is matched with a first encrypted account identifier and a second account number whose corresponding encrypted account number is matched with a second encrypted account identifier that is indicated as being linked to the first encrypted account identifier.

2. The method of claim 1, further comprising:

storing, in a memory of the second computing device, the plurality of account profiles, wherein each account profile includes at least the respective encrypted account number and account data; and updating, by the processor of the second computing device, one or more account profiles stored in the memory to indicate a link to another account profile, wherein the account number included in the account profile being updated is a first account number in a specific account number pair, and the account number included in the another account profile is a second account number in the specific account number pair.

3. The method of claim 1, wherein each encrypted account identifier corresponds to a payment card associated with a payment account, and wherein the another encrypted account identifier indicated as being linked to the encrypted account identifier corresponds to a reissued payment card associated with the payment account.

4. The method of claim 2, wherein the updating of the one or more account profiles stored in the memory of the second computing device to indicate a link to another account profile includes merging each of the one or more account profiles with the linked another account profile.

5. The method of claim 1, wherein the received account linkage data is de-identified prior to receipt by the receiver of the second computing device.

6. A system for linking accounts, comprising:

a first computing device;

a second computing device; and an external computing system separate and distinct from the first computing device and the second computing device, wherein said first computing device includes
- a memory configured to store a plurality of account profiles, wherein each account profile includes at least an account number and account data,
- a processing device configured to encrypt, via a one-way encryption, the account number included in each account profile to obtain an encrypted account number and
- a transmitter configured to transmit, to the second computing device, the encrypted account number encrypted by the processing device, wherein said second computing device does not receive any unencrypted account numbers from the first computing device, and said second computing device includes
- a receiver configured to receive
  - the encrypted account number from the first computing device; and
  - account linkage data, from the external computing system, the account linkage data including (i) a plurality of encrypted account identifiers encrypted by said external computing system and (ii) indications of linkages between encrypted account identifiers of the plurality of encrypted account identifiers included in the account linkage data, wherein the one-way encryption used by the processing device of the first computing device to encrypt the account number included in each account profile is the same as an encryption used to encrypt the encrypted account identifiers included in the account linkage data received by the receiving device of the payment processing server, wherein the second computing device does not receive any unencrypted account numbers from the external computing system, and
- a processor configured to
  - match at least one encrypted account identifier of the plurality of encrypted account identifiers included in the received account linkage data to an encrypted account number encrypted by the first computing device, and
  - identify one or more account number pairs, wherein each account number pair includes a first account number whose corresponding encrypted account number is matched with a first encrypted account identifier and a second account number whose corresponding encrypted account number is matched with a second encrypted account identifier that is indicated as being linked to the first encrypted account identifier, wherein the first computing device does not possess the account linkage data received by the second computing device from the external computing system.

7. The system of claim 6, wherein the second computing device further includes a memory configured to store the plurality of account profiles, wherein each account profile includes at least the respective encrypted account number and account data, and the processor of the second computing device is further configured to update one or more account profiles stored in the memory to indicate a link to another account profile, wherein the account number included in the account profile being updated is a first account number in a specific account number pair, and the account number included in the another account profile is a second account number in the specific account number pair.

8. The system of claim 6, wherein each encrypted account identifier corresponds to a payment card associated with a payment account, and wherein the another encrypted account identifier indicated as being linked to the encrypted account identifier corresponds to a reissued payment card associated with the payment account.

9. The system of claim 6, wherein the processor of the second computing device is configured to update the one or more account profiles stored in the memory of the second computing device by merging each of the one or more account profiles with the linked another account profile.

10. The system of claim 6, wherein the received account linkage data is de-identified prior to receipt by the receiver of the second computing device.

* * * * *